(12) United States Patent
Tanijiri et al.

(10) Patent No.: US 6,297,898 B1
(45) Date of Patent: Oct. 2, 2001

(54) OPTICAL DEFLECTION DEVICE

(75) Inventors: Yasushi Tanijiri, Osakasayama; Hiroaki Ueda, Suita; Kenji Ishibashi, Izumi; Yasushi Kobayashi, Itami; Takatoshi Ishikawa, Osaka; Soh Ohzawa, Toyonaka; Hideki Nagata, Kobe, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/395,615

(22) Filed: Sep. 14, 1999

(30) Foreign Application Priority Data

Sep. 16, 1998 (JP) .................................................. 10-261467

(51) Int. Cl.[7] .................................................. G02B 26/08
(52) U.S. Cl. ..................... 359/224; 359/213; 359/214; 359/223
(58) Field of Search ..................... 359/198–200, 359/223, 224, 226, 212–214

(56) References Cited

U.S. PATENT DOCUMENTS

| 5,557,444 | 9/1996 | Melville et al. . |
| 5,982,521 | * 11/1999 | Bessho et al. .......................... 359/198 |

FOREIGN PATENT DOCUMENTS 07049462    2/1995   (JP) .

* cited by examiner

*Primary Examiner*—James Phan
(74) *Attorney, Agent, or Firm*—Burns, Doane, Swecker & Mathis, LLP

(57) ABSTRACT

An optical deflection device for deflecting light by a mirror mounted on the tip of a rod-like torsion spring which oscillates at near resonance frequency. An optical deflection device which produces a large amplitude by exerting control to avoid variation in the natural oscillation frequency of the torsion spring (including mirror) regardless of temperature fluctuation.

15 Claims, 12 Drawing Sheets

OPTICAL DEFLECTION DEVICE

RELATED APPLICATIONS

This application is based on Patent Application No. HEI 10-261467 filed in Japan, the entire content of which is hereby incorporated by reference.

BACKGROUND OF THE INVENTION

1. Field of the Invention

The present invention relates to an optical deflection device.

2. Description of the Related Art

Laser scanning type projection image display devices which display a two-dimensional projection image by scanning using a laser beam light source are more expensive than display devices using a two-dimensional display element such as a liquid crystal display or the like, but provide various advantages in that they have excellent color reproducibility, low power consumption and the like.

The head-mounted display (HMD) shown in FIG. 23 is an example of the conventional art of a scanning type projection image display device. FIG. 23 briefly shows an HMD optical system viewed from above. Reference number 101 refers to a main scanning mirror for scanning light in a horizontal direction. As can be understood from the structure viewed from the horizontal shown within the circle, a laser beam emitted from a laser light source 102 is modulated by the projection image signals, and condensed by a condenser lens 103, then impinges the main scanning mirror 101.

Reference number 104 refers to a sub scan mirror for scanning the light from the main mirror 101 in a perpendicular direction. Reference number 106 refers to a concave surface mirror for projecting a virtual image to the pupil of an observer. Reference number 105 refers to a half-mirror which participates with the concave surface mirror 106 to reflect the light emitted from the subscan mirror 104, and participates in transmitting the light from the concave surface mirror 106 to the pupil of the observer. The main scanning means 101 is formed at a position approximately conjugate to the pupil position of the observer through the concave surface mirror 106.

In this scanning type projection image display device, the number of scan lines per screen must be increased to provide a high resolution image. For this reason the scanning frequency of the scanning means such as a scanning mirror must be very high. For example, in order to display a projection image of 1,000 horizontal scan lines, a scanning frequency in the horizontal direction of 60 kHz is required.

In an optical deflection device using a galvano mirror and a rotating polygonal mirror using an electromagnetic motor, it is difficult to obtain the aforesaid high frequency. However, an optical deflection device having a resonance mirror using spring resonance is known to be effective in obtaining a high frequency.

In an optical deflection device having a resonance mirror, the light must scan at a large amplitude to display a projection image at a wide field angle. Amplitude relative to energy is determined by the amplitude magnification and natural oscillation frequency determined by the spring constant and moment of inertia of the oscillation system. The maximum oscillation magnification is obtained when the natural oscillation frequency of the oscillation system matches the drive frequency of the drive system. That is, a large oscillation can be obtained using little energy by setting the natural oscillation frequency near the drive frequency to increase the oscillation magnification. Accordingly, in a typical optical deflection device, the natural oscillation frequency of the oscillation system approximately matches the drive frequency of the drive system.

The natural oscillation frequency of the oscillation system fluctuates depending on temperature. This change occurs because the spring constant changes if the flexibility of a spring is changed by temperature. In optical deflection devices, for example, when a specific frequency projection image is presented, the ambient temperature changes and the natural oscillation frequency changes so as to disadvantageously reduce the amplitude so that a maximum amplitude magnification cannot be obtained. U.S. Pat. No. 5,557,444 and Japanese Laid-Open Patent No. HEI 7-49462 disclose art to eliminate this disadvantage.

The optical deflection device disclosed in U.S. Pat. No. 5,557,444 arranges a mirror in the center of a torsion spring, to adjust the spring tension by combining materials having different coefficients of expansion, so as to make the natural oscillation frequency adjustable.

The optical deflection device disclosed in Japanese Laid-Open Patent No. HEI 7-49462 detects the temperature in the vicinity of the oscillation system, and controls the drive frequency based on the detection result. In this instance, even if the natural oscillation frequency of the oscillation system changes due to temperature fluctuation, the drive system can be driven at a drive frequency in accordance with the change. In this way the oscillation system is controlled so as to resonate.

In a high-speed resonance state, the adjustment range becomes extremely narrow, and fine adjustment is difficult. In the adjustment method disclosed in U.S. Pat. No. 5,557,444, fine adjustment is difficult and a desired natural oscillation frequency cannot be obtained.

When the drive frequency is changed as in the optical deflection device of Japanese Laid-Open Patent No. HEI 7-49462, it becomes necessary to change the frequency of the projection image signals, thereby disadvantageously increasing the cost. In conventional optical deflection devices, only one natural a oscillation frequency typically can be obtained, which is disadvantageous from the perspective of general purpose utility.

SUMMARY OF THE INVENTION

An object of the present invention is to eliminate the previously described disadvantages.

Another object of the present invention is to provide an optical deflection device having a resonance mirror with high scanning speed and large oscillation amplitude and stable performance.

Still another object of the present invention is to provide an optical deflection device capable of changing the scanning speed over a wide range.

These and other objects are attained by an optical deflection device comprising a spring, a reflective mirror which oscillates via the oscillation of the spring, an oscillator for oscillating the spring near a resonance frequency of the spring, and alteration means for changing a natural oscillation frequency of an oscillation system including the spring and the reflective mirror.

These objects of the invention are further attained by providing an optical deflection device comprising a spring, a reflective mirror attached to the spring, an oscillator for oscillating the spring, a detector for detecting an amplitude of the reflective mirror, and alteration means for changing a natural oscillation frequency of the spring in accordance with the amplitude detected by the detector.

The invention itself, together with further objects and attendant advantages will be best understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

The first through the eighteenth embodiments are described below. First, the overall construction of the optical deflection device of the first embodiment is described below with reference to FIG. 1 which shows the basic construction common to all the embodiments.

Figure 1:
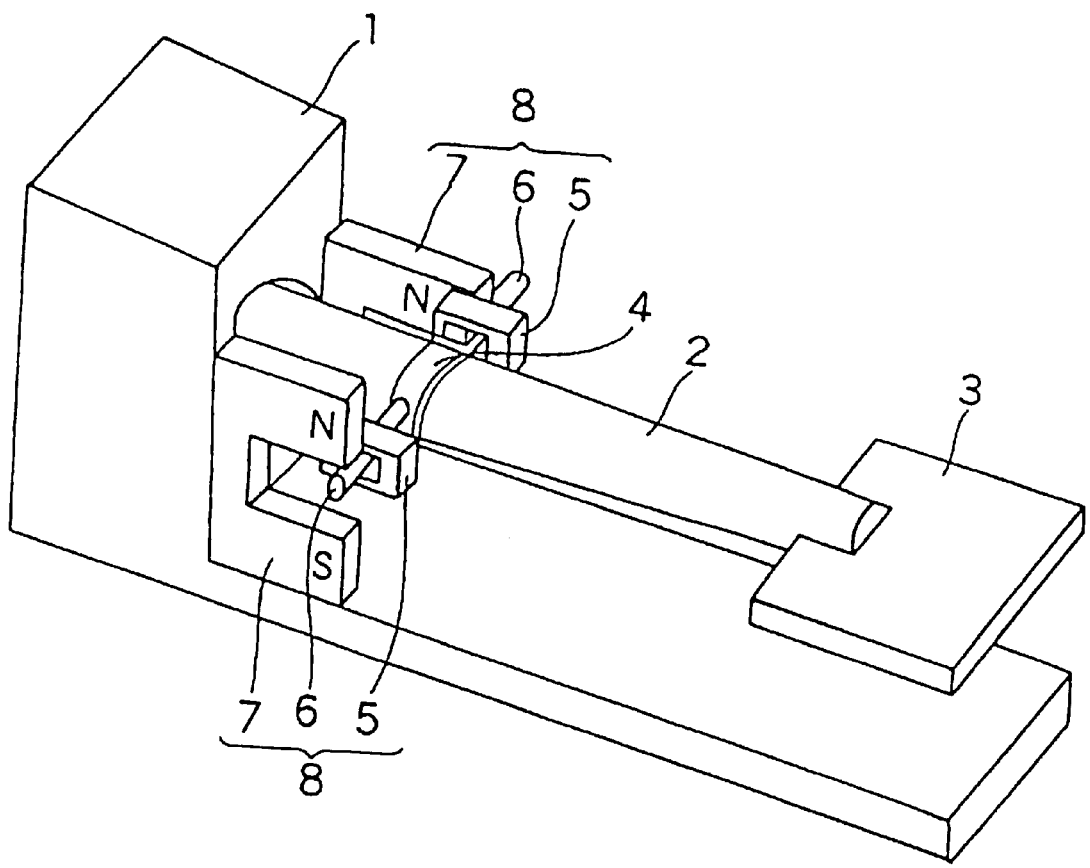
FIG. 1 shows the overall construction of the optical deflection device of a first embodiment.

The optical deflection device of FIG. 1 comprises a reflective mirror 3 for deflecting the light, a rod-like torsion spring 2 for oscillating the reflective mirror 3, a drive unit 8 for oscillating the torsion spring 2, and a base 1. The drive unit 8 comprises a lateral coil 5, a lateral permanent magnet 7, a lateral drive shaft 6 formed of a magnetic member of iron or the like, and a ring 4.

The reflective mirror 3 is fixedly attached to one end of the torsion spring 2. The other end of the torsion spring 2 is connected to the base 1. The drive unit 8 is constructed so as to impart a torsional vibration drive force near the base of the torsion spring 2. The squared U-shaped lateral permanent magnet 7 is fixedly attached at a position on the base 1 so as to be laterally symmetrical about the torsion spring 2. The ring 4 is inserted on and attached near the base of the torsion spring 2.

The lateral coil 5 is supported at a position medial to the torsion spring 2 and the lateral permanent magnet 7. The lateral drive shaft 6 is arranged through the center of the coil 5, and one end of the drive shaft 6 is disposed within the magnetic field of the permanent magnet 7, whereas the other end is fixedly attached to the ring 4. The drive shaft 6 and the ring 4 may be integratedly formed. In the drive unit 8, the drive shaft 6 is an electromagnet which supplies current to the coil 5. At this time, the ends of the permanent magnet 7 on the lateral drive shaft 6 side controls the direction of the current flowing to the coil 5 so as to maintain mutually opposite polarities.

The lateral drive shaft 6 forming the electromagnet 1receives a force in an upward direction on one end and a downward force at the other end by the magnetic field of the permanent magnet 7. This force is transmitted as a rotational force to the torsion spring 2 via the ring 4. The direction of the current flowing to the coil 5 can be switched at a frequency near the natural oscillation frequency of the oscillation system including the torsion spring 2 and the reflective mirror 3, so as to reverse direction of the magnetic poles generated at the end of the drive shaft 6 on the permanent magnet 7 side at a resonance frequency.

Accordingly, the rotation direction of the torsion spring 2 is reversed by the resonance frequency. In this way the torsion spring 2 attains torsional resonance. The reflective mirror 3 attached to the tip of the torsion spring 2 oscillates about the rotational center of the two torsional axis of the torsion spring 2.

Reference number 26 refers to a detector for detecting the amplitude of the reflective mirror 3. The detector 26 is provided below the reflective mirror 3, to detect the amplitude of the reflective mirror 3. The detector 26 comprises a line sensor for detecting the light reflected from the reflective mirror 3.

The basic construction of the optical deflection devices of the second through eighteenth embodiments have slightly different constructions of connecting parts between the torsion spring and the base, and shape of the torsion spring and the base, and although they have structural components in addition to the essential construction of FIG. 1, the basic constructions are identical. In each embodiment, the description of basic structures which overlap the previous description are omitted. Furthermore, basic structural elements may be omitted from the drawing of the various embodiments for the purpose of simplification.

In the optical deflection device, it is desirable that the natural oscillation frequency of the oscillation system during oscillation approximately matches the drive frequency of the drive means, such that the oscillation system attains a state of resonance. Since the natural oscillation frequency of the oscillation system fluctuates, for example, depending on temperature, a control means is required for maintaining a resonance state even when the temperature changes. The optical deflection device of each embodiment has a construction for modifying the natural oscillation frequency of the oscillation system.

When the oscillation system is not in a resonant state, i.e., when the natural oscillation frequency of the oscillation system does not match the drive frequency of the drive system, controls are executed so as to change the natural oscillation frequency of the oscillation system to match the drive frequency of the drive system. Ergo, the oscillation system attains a state of resonance.

In the first through sixth embodiments, the spring constant is changed by changing the effective spring length of the torsion spring, so as to change the natural oscillation frequency of the oscillation system. Since the spring constant decreases as the spring length becomes longer, the natural oscillation frequency also is reduced. The natural frequency control means of the seventh through eleventh embodiments change the spring constant by changing the temperature of the spring, thereby changing the natural oscillation frequency of the oscillation system. Since the coefficient of elasticity is reduced as the spring temperature rises, the natural oscillation frequency also is reduced. The natural frequency control means of the twelfth through eighteenth embodiments change the natural oscillation frequency of the oscillation system by changing the inertia or changing the center of gravity position of the oscillation system. The natural oscillation frequency is reduced as the inertia increases. The natural oscillation frequency decreases as the center of gravity moves from the base of the spring.

First Embodiment

Figure 2:
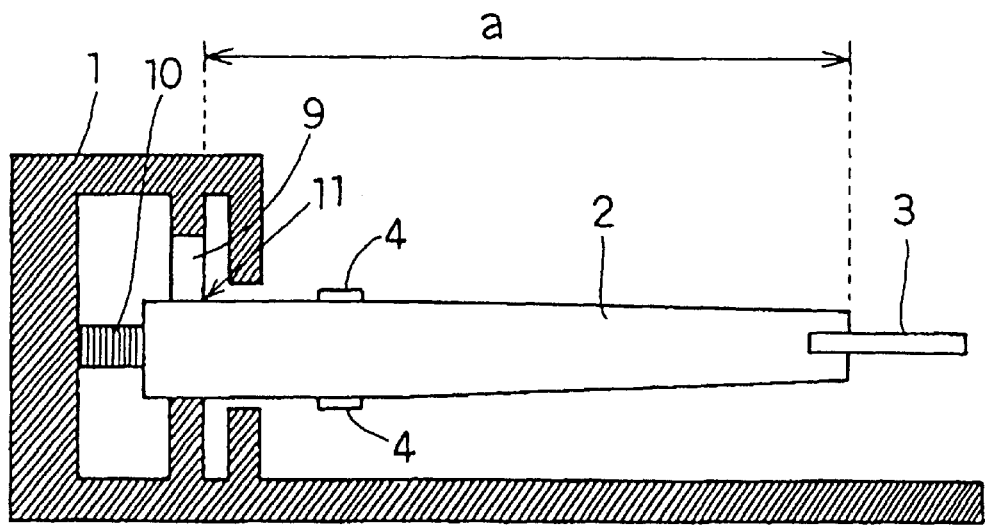
FIG. 2(A) is a right angle section view of the optical deflection device of the first embodiment.
FIG. 2(B) is a block diagram of the control block of the optical deflection device of the first embodiment.
Figure 2:
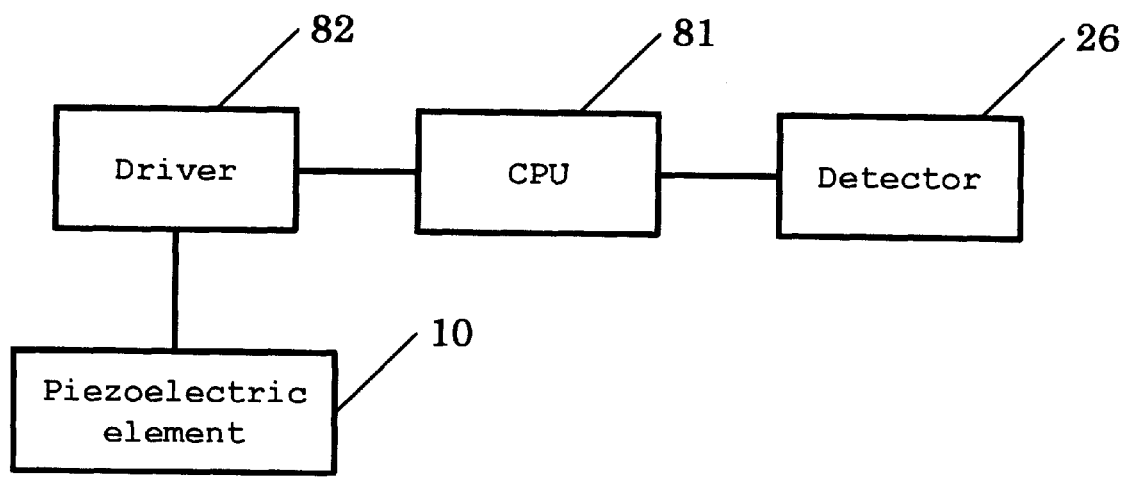

FIG. 2(A) shows a right angle cross section view of the optical deflection device of FIG. 1. The torsion spring 2 is a rod-like member having a circular cross section, and the diameter of the circular cross section decreases from the approximate center area toward the end on the reflective mirror 3 side. According to this shape, the torsional stress occurs linearly in accordance with the amount of torsion and major diameter. That is, a predetermined amount of torsion and a predetermined torsional stress can be achieved through controls. The thinning of the torsional spring 2 on the reflective mirror 3 side prevents a reduction of the natural oscillation frequency due to its own weight. Accordingly, the torsion is stronger, the amplitude is larger, and the natural oscillation frequency is larger than a rod-like member of uniform diameter. In a rod-like member of uniform diameter, the amount of torsion becomes nonlinear due to weight inertia.

Reference number 9 refers to a support member for supporting the torsion spring 2, and possesses elasticity. One end of the support 9 is fixedly attached to the base 1, and the other end presses against the torsion spring 2 so as to support the torsion spring 2. A position 11, which is the end on the reflective mirror 3 side within the area of the torsion spring 2 in contact with the support 9, is the support position of the torsion spring 2. The effective spring length of the torsion spring 2 is the length a from the support position 11 to the end on the reflective mirror 3 side. Reference number 10 refers to a piezoelectric element of which one end is attached to the base 1 and the other end is attached to the torsion spring 2.

FIG. 2(B) is a diagram of the control block of the optical deflection device. Reference number 81 refers to a central processing unit (CPU), and reference number 82 refers to a driver for impressing a predetermined voltage to the piezoelectric element 10. The CPU 81 impresses a voltage to the piezoelectric element 10 so as to maximize the amplitude of the reflective mirror 3 based on the detection result from the sensor 26. That is, control is executed to impress a voltage on the piezoelectric element 10 so as to attain a spring length resulting in resonance of the oscillation system.

In the first embodiment, the natural oscillation frequency is adjusted by changing the spring length a. Specifically, the length of the piezoelectric element 10 is adjusted in the horizontal direction in the drawing by changing the voltage applied to the piezoelectric element 10. When the length of the piezoelectric element 10 changes, the torsion spring 2 adhered thereto moves in the torsion spring center axis direction so as to change the spring length a by changing the support position 11.

When increasing the natural oscillation frequency of the oscillation system, the length of the piezoelectric element 10 is shortened by reducing the voltage applied to the piezoelectric element 10. When the length of the piezoelectric element 10 is reduced, the torsion spring 2 is pulled to the left side in the drawing, thereby reducing the spring length a. In this way the natural oscillation frequency is increased. On the other hand, when decreasing the natural oscillation frequency of the oscillation system, the length of the piezoelectric element 10 is lengthened by increasing the voltage applied to the piezoelectric element 10. When the length of the piezoelectric element 10 is increased, the torsion spring 2 is pushed to the right side in the drawing, thereby increasing the spring length a. In this way the natural oscillation frequency is decreased. In these controls, the value of the voltage applied to the piezoelectric element 10 is regulated to control the value of the natural oscillation frequency.

In the following embodiments, the control object is controlled by the CPU 81, which is a component corresponding to each embodiment.

Second Embodiment

Figure 3:
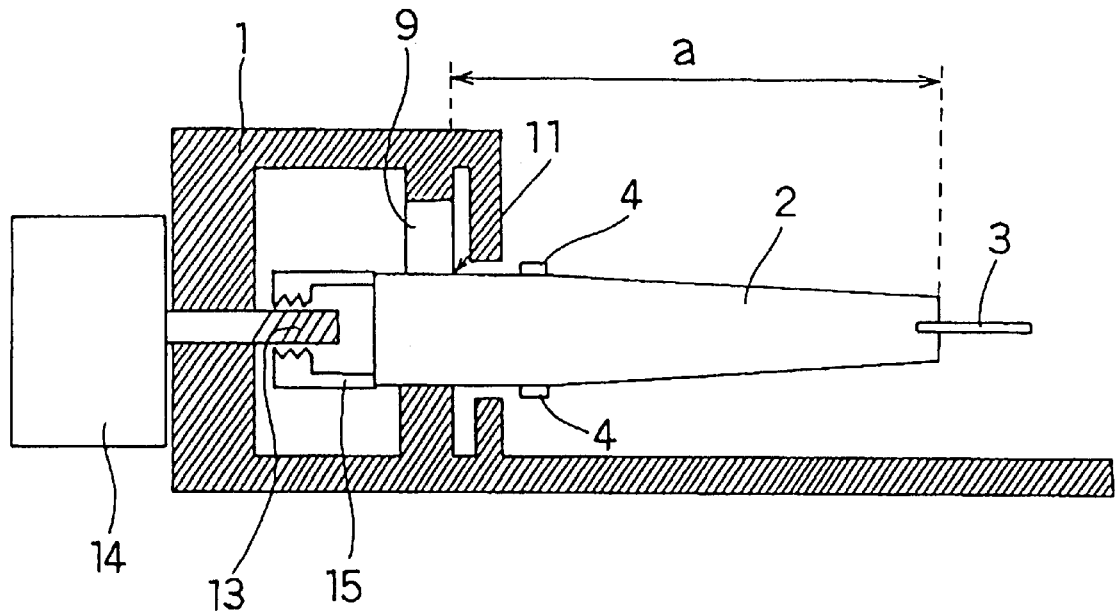
FIG. 3 is a right angle section view of the optical deflection device of the second embodiment.

FIG. 3 is a right angle cross section view of the optical deflection device of a second embodiment. This optical deflection device is substantially similar to the first embodiment and the construction differs only in the components for changing the spring length a of the torsion spring 2, and therefore only the parts differing from the first embodiment are described below.

In the second embodiment, the piezoelectric element 10 of the first embodiment is replaced by a motor 14, a rotating shaft 13 of the motor 14, and a screw 15. These parts regulate the spring length a. The rotating shaft 13 of the motor 14 passes through the base 1, and has a length so as to not contact the torsion spring 2. The rotating shaft 13 is threaded in a fixed range at the end of the rotating shaft 13 on the torsion spring 2 side so as to engage the screw 15. One end of the screw 15 is fixedly attached to the torsion spring 2, and the other end engages the threads of the rotating shaft 13.

The rotating shaft 13 rotates via the rotation of the motor 14, and the screw 15, which engages the rotating shaft 13, moves in the rotational center axis direction of the rotating shaft 13. When the screw 15 moves, the torsion spring 2 attached to the screw 15 also moves, thereby changing the spring length a because the support position 11 of the support 9 has changed.

In the second embodiment, the torsion spring 2 is controlled so as to maintain resonance by controlling the amount of rotation of the motor 14 via the CPU 81, i.e., by controlling the spring length a.

Third Embodiment

Figure 4:
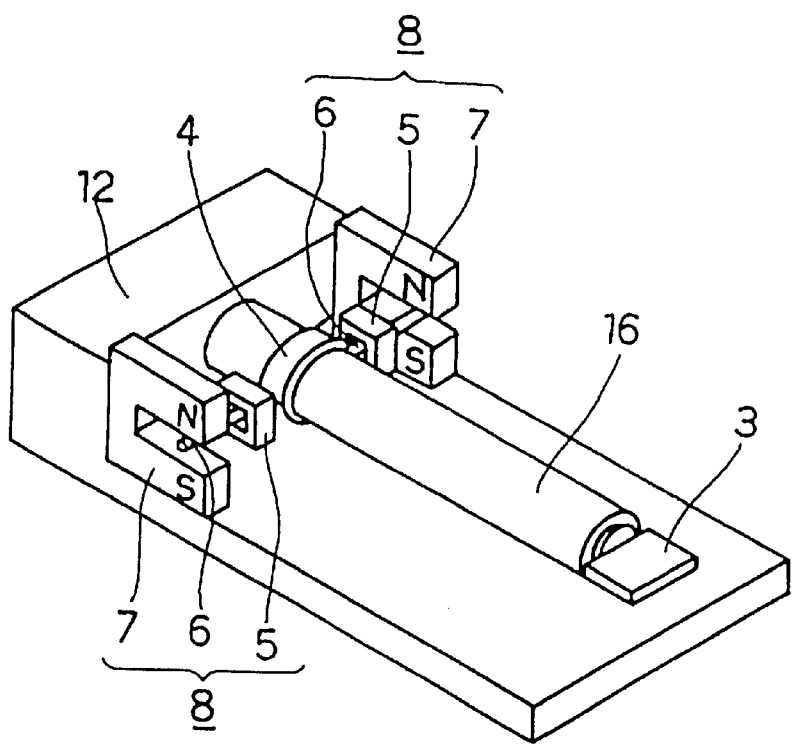
FIG. 4 shows the overall construction of the optical deflection device of a third embodiment.
Figure 5:
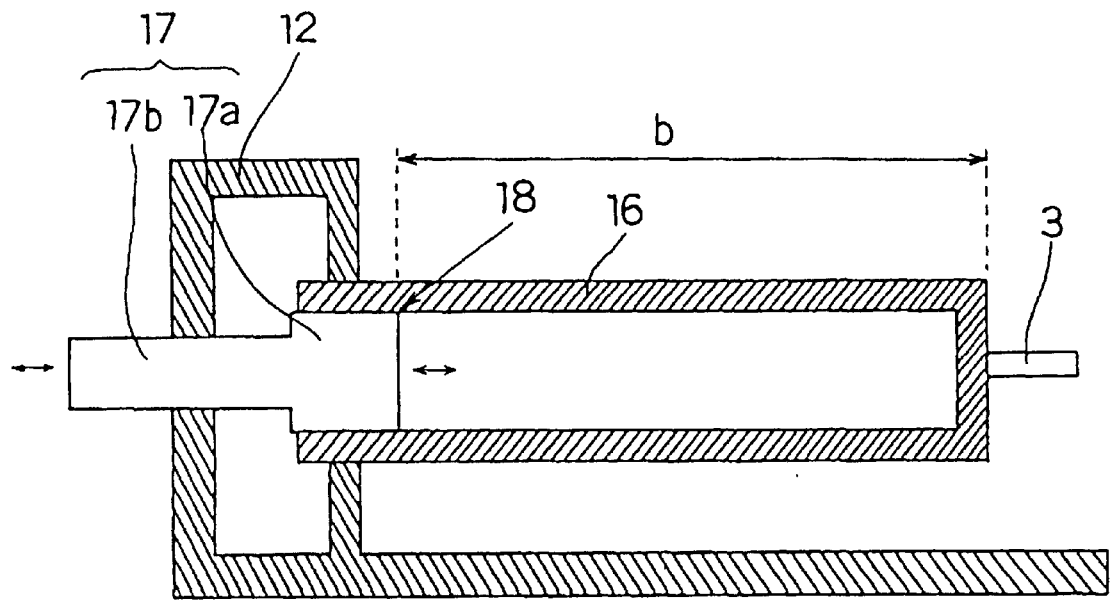
FIG. 5 is a right angle section view of the optical deflection device of the third embodiment.

FIG. 4 shows the overall construction of the optical deflection device of a third embodiment. FIG. 5 is a brief right angle cross section view of the same. This optical deflection device comprises a torsion spring 16, a base 12, a drive unit 8, and a reflective mirror 3. The construction and operation of the drive unit 8 is identical to that of the first embodiment ands is not described further.

As can be understood from FIG. 5, the torsion spring 16 comprises a rod-like member having a hollow interior. In FIG. 5, reference number 17 refers to a spring length regulator. The spring length regulator 17 comprises a cylinder 17a adhered to the hollow interior cavity of the torsion spring 16, and a rod-like member 17b which passes through the base 12 and is thinner than the cylinder 17a.

The support position of the torsion spring 16 is position 18 at the end of the part of the cylinder 17a adhered to the torsion spring 16 on the reflective mirror 3 side. The effective spring length of the torsion spring 16 is length b from the support position 18 to the end on the reflective mirror 3 side.

The spring length regulator 17 changes the contact position of the cylinder 17a within the torsion spring 16 by moving in a horizontal direction in the drawing. A motor, for example, may be used as a means for moving the spring length regulator 17 in the horizontal direction. When the contact position is changed, the support position 18 changes, thereby changing the effective spring length b. It is possible to change the natural oscillation frequency of the torsion spring 16 by changing the spring length b. As a result, the natural oscillation frequency is regulated so as to control the resonance of the torsion spring 16. In the third embodiment, the movement of the spring length regulator 17 is controlled by the CPU 81 so as to achieve resonance of the oscillation system based on the detection result of the sensor 26.

Fourth Embodiment

Figure 6:
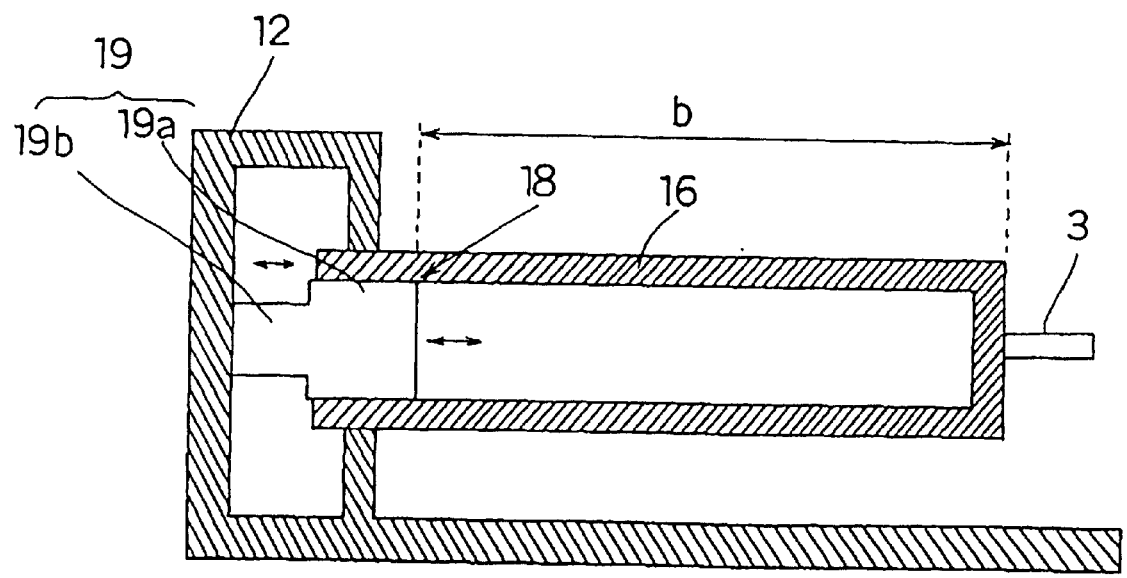
FIG. 6 is a right angle section view of the optical deflection device of the fourth embodiment.

FIG. 6 is a right angle cross section view of the optical deflection device of a fourth embodiment. This optical deflection device is substantially similar to the third embodiment and differs only in the spring length regulator; only parts which differ from the third embodiment are described below.

In the fourth embodiment, the spring length regulator 17 of the third embodiment is replaced by the spring length regulator 19 which comprises a cylinder 19a adhered to the interior cavity of the torsion spring 16, and a cylinder 19b which is narrower than the cylinder 19a and one end of which is attached to the base 12. The spring length regulator 19 has different coefficient of expansion in the horizontal direction in the drawing depending on the temperature, so as to expand and contract in the horizontal direction via temperature change. When the temperature changes, the contact position changed within the torsion spring 16. When the contact position changes, the support position 18 changes, thereby changing the effective spring length b of the torsion spring 16 similar to the third embodiment.

The CPU 81 controls the temperature of the spring length regulator 19 so as to maintain resonance of the oscillation system. The spring length regulator 19 also may comprise a piezoelectric element. In this instance, the support position 18 is changed by the expansion and contraction of the piezoelectric element. In such a construction, as controller is provided to control the voltage applied to the piezoelectric element, and thereby control the resonance of the oscillation system. The embodiments are identical up to the point of the control based on the amplitude data of the reflective mirror detected by the sensor.

Fifth Embodiment

Figure 7:
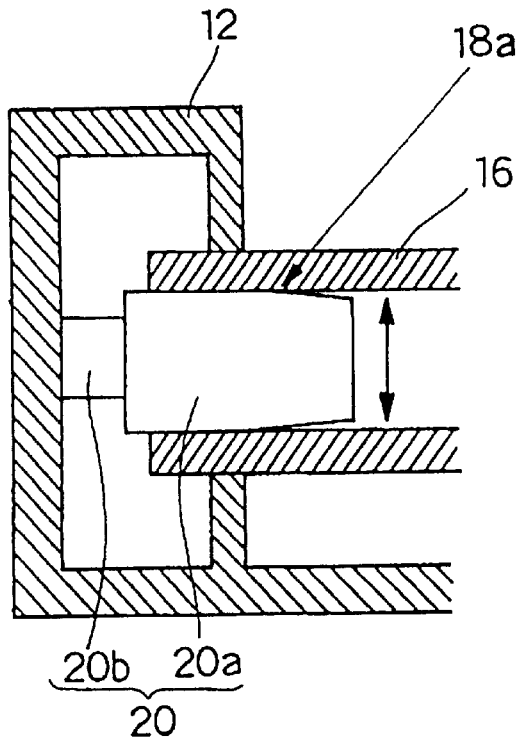
FIGS. 7(a)–7(b) are right angle section views of part of the optical deflection device of a fifth embodiment.
Figure 7:
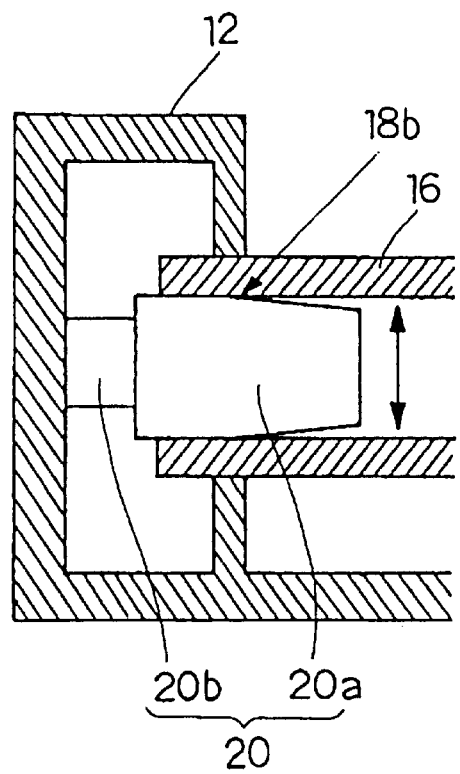

FIG. 7 shows a right angle cross section view of part an optical deflection device of a fifth embodiment including the connection between the torsion spring 16 and the base 12. This optical deflection device is substantially similar to the third embodiment and differs only in the spring length regulator of the torsion spring 16; only parts which differ from the third embodiment are described below.

In the fifth embodiment, the spring length regulator 17 of the third embodiment is replaced by the spring length regulator 20 which comprises a member 20a having a circular cross section and part of which is adhered to the interior cavity of the torsion spring 16, and a rod-like 20b which is narrower than the cylinder 20a and one end of which is attached to the base 12. A part of the member 20a from the center on the reflective mirror 3 side has a diameter of circular cross section which becomes smaller toward the reflective mirror 3 side.

The member 20a is formed using an expanding material having a different expansion coefficient in the diameter direction of the cross section depending on the temperature. The member 20a expands or contracts when the temperature changes, and the support position changes in the hollow part. For example, when the temperature changes from the state shown in FIG. 7(a), the member 20a contracts and the support position changes from 18a to 18b as shown in FIG. 7(b). When the support position changes the effective spring length changes as in the third and fourth embodiments, although omitted from the present drawing. The CPU 81 controls the temperature of the member 20a of the spring length regulator 20 so as to maintain resonance of the oscillation system.

Sixth Embodiment

Figure 8:
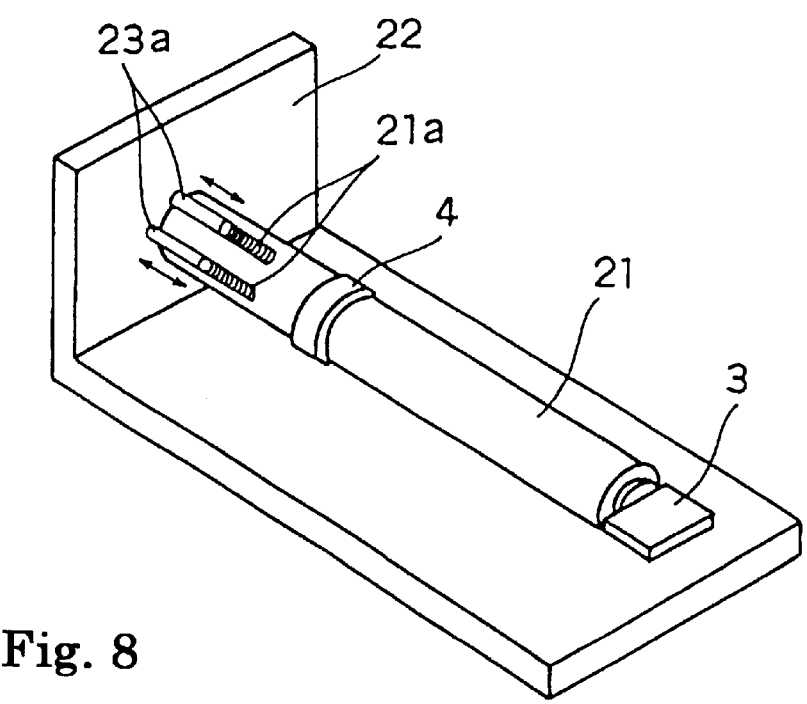
FIG. 8 shows the overall construction of the optical deflection device of a sixth embodiment.
Figure 9:
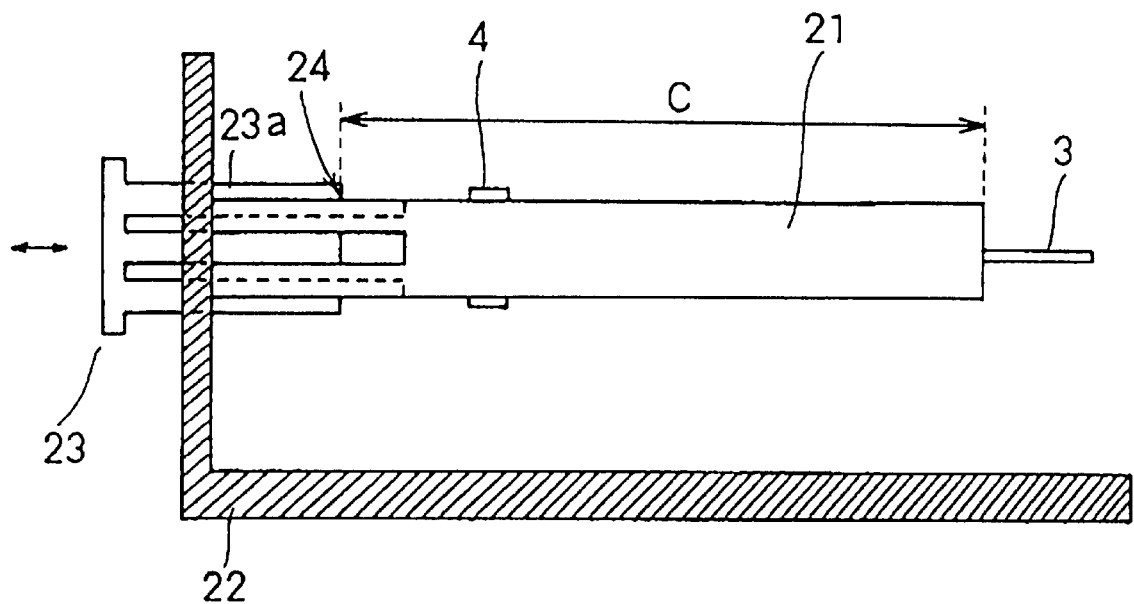
FIG. 9 is a right angle section view of the optical deflection device of the sixth embodiment.

FIG. 8 shows an overall construction of an optical deflection device of a sixth embodiment. FIG. 9 is a right angle cross section view. This optical deflection device is substantially similar to the first embodiment with the exception of the construction of a torsion spring, base, and a member for regulating spring length, and other essential parts are the same. Accordingly, only the torsion spring 21, base 22, reflective mirror 3, ring 4, and spring length regulator 23 are shown in the drawing; other parts are omitted and may be referred to in FIG. 1.

Figure 10:
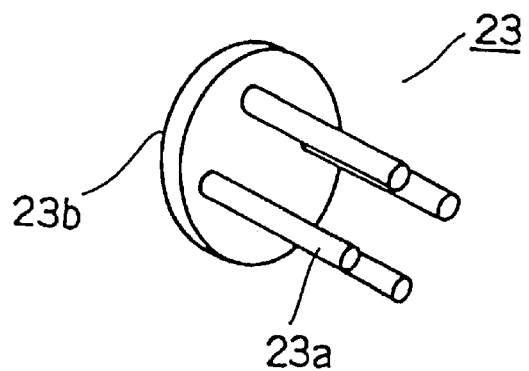
FIG. 10 is a detailed view of the spring length adjustment member 23 of the sixth embodiment.

The torsion spring 21 is a rod-like member. One end of the torsion spring 21 is attached to the reflective mirror 3, and the other end is attached to the base 22. Four channels 21a extending in the rotational axis direction are formed on the end of the torsion spring 21 on the base 22 side. Details of the construction of the spring length regulator 23 are shown in FIG. 10. The spring length regulator 23 has four rod-like legs 23a mounted on a circular member 23b.

As shown in FIG. 9, the four legs 23a of the spring length regulator 23 pass through the base 22 and are inserted in the channels 21a of the torsion spring 21, so as to be freely oscillatable in the horizontal direction in the drawing. Since the spring length regulator 23 is a hard member, the part of the legs 23a of the spring length regulator 23 inserted in the torsion spring 21 does not oscillate. The effective spring length is the length c from the support position 24, i.e., the position of contact with the tip of the legs 23a, to the fixed part of the reflective mirror 3.

Since the spring length regulator 23 is oscillatable in the horizontal direction, the effective spring length c can be adjusted by moving the support position 24 in a horizontal direction. The CPU 81 controls the movement of the spring length regulator 23 so as to maintain the resonance of the oscillation system based on the detection result from the sensor 26.

Seventh Embodiment

Figure 11:
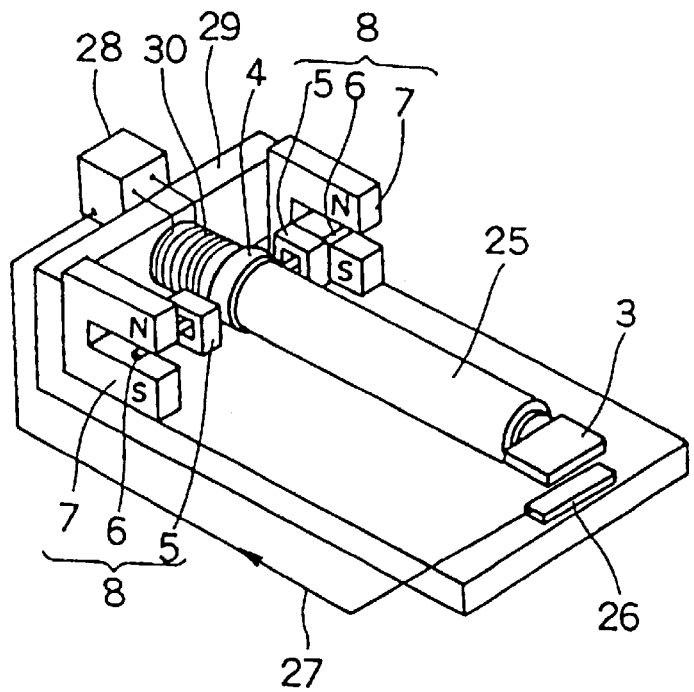
FIG. 11 shows the overall construction of the optical deflection device of a seventh embodiment.

FIG. 11 shows the overall construction of the optical deflection device of a seventh embodiment. The reflective mirror 3 is attached to one end of the rod-like torsion spring 25, and the other end is attached to the base 29. The natural oscillation frequency control means of the present embodiment comprises a spring temperature regulating means incorporating controller 28 and a coil 30 wrapped around part of the torsion spring 25 between the base 29 and the ring 4. The spring temperature regulating means generates an induced electromotive force by current flowing to the coil 30, so as to heat the torsion spring 21. The temperature of the torsion spring 25 is controlled by controlling the current flowing to the coil 30.

The sensor 26 is provided below the reflective mirror 3, and detects the amplitude of the reflective mirror 3. The detection result is transmitted to the controller 28 via a signal line 27. The sensor 26 may comprise, for example, a line sensor which detects the reflected light from the reflective mirror 3. The controller 28 controls the spring temperature based on the detection result transmitted from the sensor 26, so as to maintain resonance of the oscillation system.

Eight Embodiment

Figure 12:
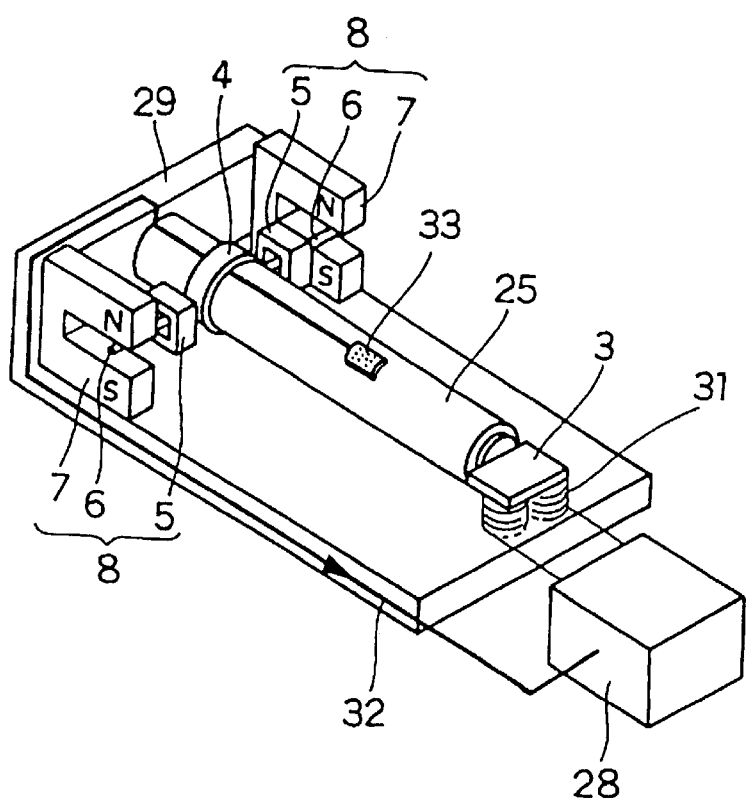
FIG. 12 shows the overall construction of the optical deflection device of an eighth embodiment.

FIG. 12 shows the overall construction of an optical deflection device of an eighth embodiment. This optical deflection device has a construction for regulating the spring temperature and includes a controller 28 and a coil 31 disposed below the reflective mirror 3. An induced electromotive force is generated when current flows to the coil 31, thereby heating the reflective mirror 3. This heat is transmitted through the reflective mirror 3 to the torsion spring 25. The controller 28 controls the temperature of the torsion spring 25 by controlling the current flowing to the coil 31.

A thermosensor 33 is arranged above the torsion spring 25. The thermosensor 33 detects the temperature of the torsion spring 25. The detection result is transmitted to the controller 28 through the signal line 32. The controller 28 compares the temperature T0 of the torsion spring 25 in the resonance state measured beforehand, and the temperature T1 of the detection result. When the temperature T1 is lower than the temperature T0, current flows to the coil 31 and the temperature of the torsion spring 25 is increased until T1 matches T0. When T1 matches T0, the oscillation system is in a state of resonance.

Ninth Embodiment

Figure 13:
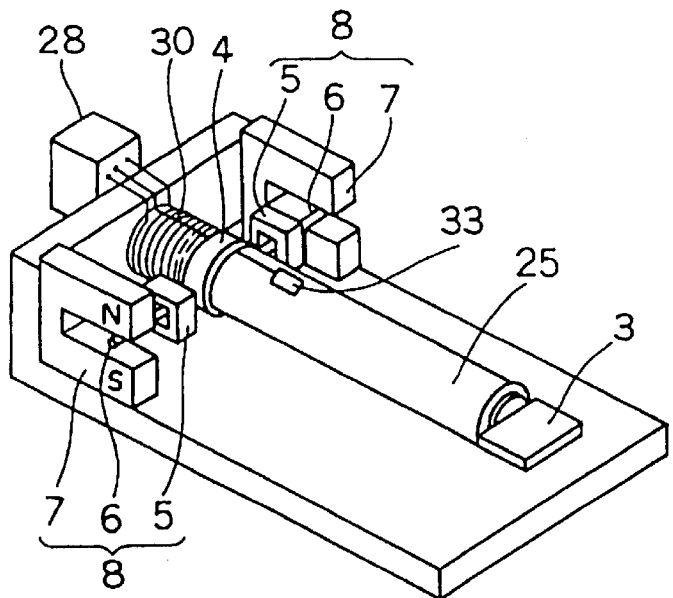
FIG. 13 shows the overall construction of the optical deflection device of an ninth embodiment.

FIG. 13 shows the overall construction of an optical deflection device of a ninth embodiment. This optical deflection device differs from the seventh embodiment in that sensor is different. The sensor is a thermosensor 33 provided above the torsion spring 25 and has a construction identical to that of the eighth embodiment.

The detection result of the thermosensor 33 is transmitted to the controller 28. The controller 28 controls the current flowing to the coil 31 using the detection result received from the thermosensor 33 by the same method as the eighth embodiment.

Tenth Embodiment

Figure 14:
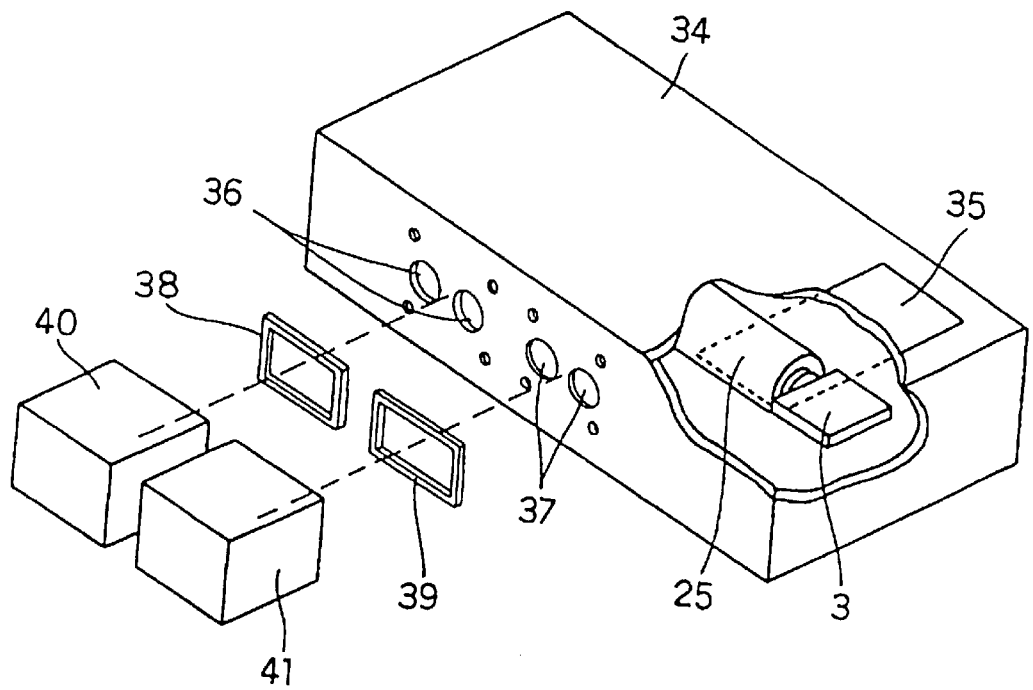
FIG. 14 shows the overall construction of the optical deflection device of a tenth embodiment.

FIG. 14 shows the overall construction of an optical deflection device of a tenth embodiment. The construction of this optical deflection device houses a part excluding the spring temperature regulating mechanism from the optical deflection device of the seventh embodiment within a housing 34. The spring temperature regulating mechanism is replaced by a heating device 40 and a cooling device 41 arranged outside the housing 34.

The housing 34 is provided with a light entrance window 35 to allow a projection image to enter to the reflective mirror 3. One side surface of the housing 34 is provided with warm air inlet/outlet holes 36 and cool air inlet/outlet holes 37. The heating device 40 and the cooling device 41 are mounted on the exterior side of the holes 36 and 37 of the housing 34 through gaskets 38 and 39. The heating device 40 feeds warm air into the housing 34 via the warm air inlet/outlet holes 36. The temperature within the housing 34 is elevated by the warm air, so as to raise the temperature of the torsion spring. The cooling device 41 feeds cool air into the housing 34 via the cool air inlet/outlet holes 37. The temperature within the housing 34 is lowered by the cool air so as to reduce the temperature of the torsion spring. The gaskets 38, 39, and devices 40 and 41 are shown in an exploded view in the drawing to facilitate understanding.

The detection device detects the amplitude of the reflective mirror 3. When the oscillation system is not in a state of resonance, the controller changes the temperature around the torsion spring 25 using either the heating device 40 or the cooling device 41, so as to indirectly change the temperature of the torsion spring 25 to attain a state of resonance.

Eleventh Embodiment

Figure 15:
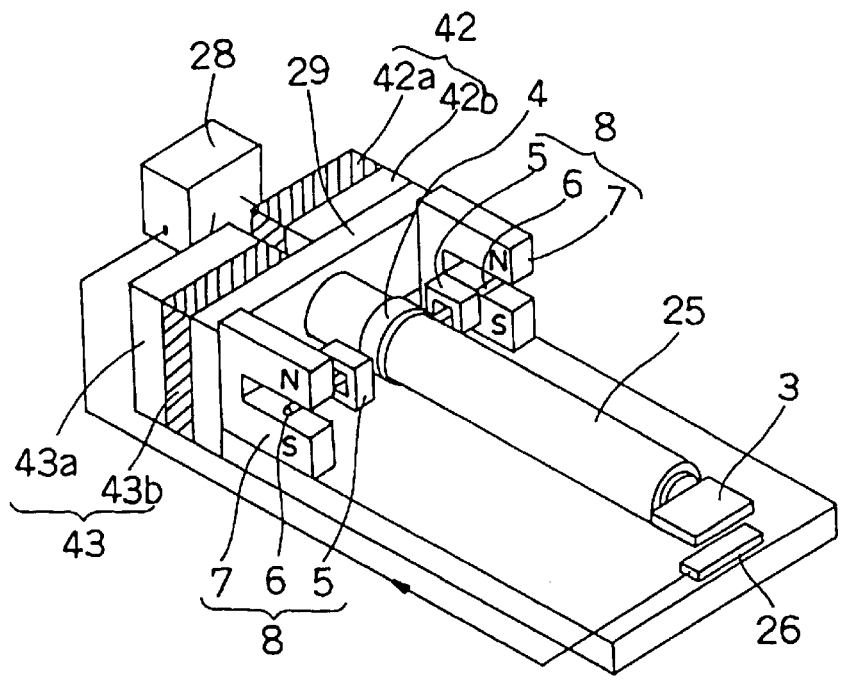
FIG. 15 shows the overall construction of the optical deflection device of an eleventh embodiment.

FIG. 15 shows the overall construction of an optical deflection device of an eleventh embodiment. In the eleventh embodiment, the coil 30 of the seventh embodiment is replaced by a heating device 43 and a cooling device 42 mounted on a base 29. The heating device 43 raises the temperature of the base 29 by heating the base 29. The cooling device 42 reduces the temperature of the base 29 by removing the heat from the base 29. In this way the temperature of the spring is controlled indirectly by changing the temperature of the base 29.

The heating device 43 and the cooling device 42 are Peltier elements. In the heating device 43, a plate 43b contacts the base 29 as a radiator plate, and a plate 43a is interposed between the base 29 and the radiator plate 43b as a heat sink. In the cooling device 42, a plate 42b contact the base 29 as a heat sink, and a plate 42a is interposed between the base 29 and the heat sink 42b as a radiator plate. According to the heating device 43, the heat from external air is absorbed by the heat sink 43a, and the absorbed heat is transmitted from the radiator plate 43b to the base 29 so as to heat the base 29. According to the cooling device 42, heat is absorbed from the base 29 by the heat sink 42b, so as to cool the base 29. The heat absorbed by the heat sink 42b is radiated outside the device by the radiator plate 42a. The controller 28 controls the cooling operation and the heating operation so as to maintain a state of resonance of the oscillation system based on the amplitude data of the reflective mirror 3 detected by the sensor.

Twelfth Embodiment

Figure 16:
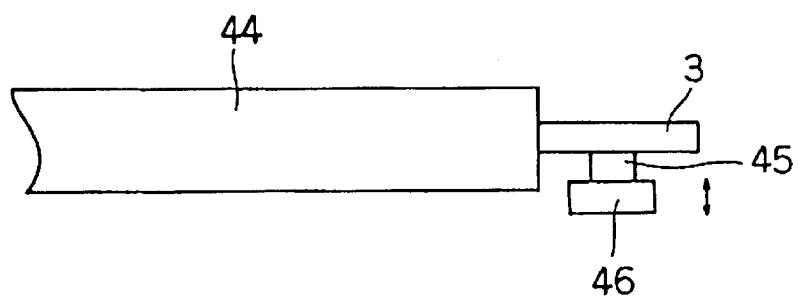
FIG. 16 briefly shows the construction of part of the optical deflection device of a twelfth embodiment.

FIG. 16 shows part of an optical deflection device of a twelfth embodiment. The torsion spring 44 is a rod-like member, and identical in construction to the torsion spring 25 of the seventh embodiment. The bottom surface of the reflecting mirror 3 is provided with an laminate-type piezoelectric element 45 which expands and contracts in a direction perpendicular to the rotational axis via an applied voltage. A spindle 46 is attached to the end of the piezoelectric element 45 on the side opposite the reflective mirror 3.

The position of the spindle 46 is moved in a vertical direction in the drawing by controlling the voltage applied to the laminate type piezoelectric element 45. The spindle 46 is included in the oscillation system, and the inertia of the oscillation system increases as the distance increases between the spindle and the rotational center axis. This inertia is adjusted by controlling the position of the spindle 46. The controller controls the position of the spindle 46 so as to attain a state of resonance of the oscillation system based on the amplitude data of the reflective mirror 3 detected by the sensor.

Thirteenth Embodiment

Figure 17:
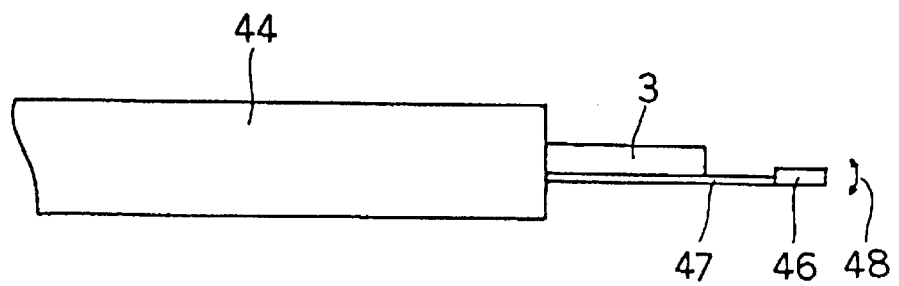
FIG. 17 briefly shows the construction of part of the optical deflection device of a thirteenth embodiment.

FIG. 17 shows part of an optical deflection device of a thirteenth embodiment. The thirteenth embodiment differs from the twelfth embodiment only in the attachment position of the spindle 46 and the member for moving the position of the spindle 46. The bottom surface of the reflective mirror 3 is provided with a long bimorph 47 in the rotational axis direction from the reflective mirror 3. One end of the bimorph 47 is attached to the torsion spring 44 in the rotational axis direction, and the other end is attached to the spindle 46. The end of the bimorph 47 on the spindle 46 side moves in the arrow 48 direction when a voltage is applied. In this way the distance of the spindle 46 from the rotational center axis is changes, so as to change the inertia of the oscillation system. The controller controls the position of the spindle 46 so as to attain a state of resonance of the oscillation system based on the amplitude data of the reflective mirror 3 detected by the sensor.

Fourteenth Embodiment

Figure 18:
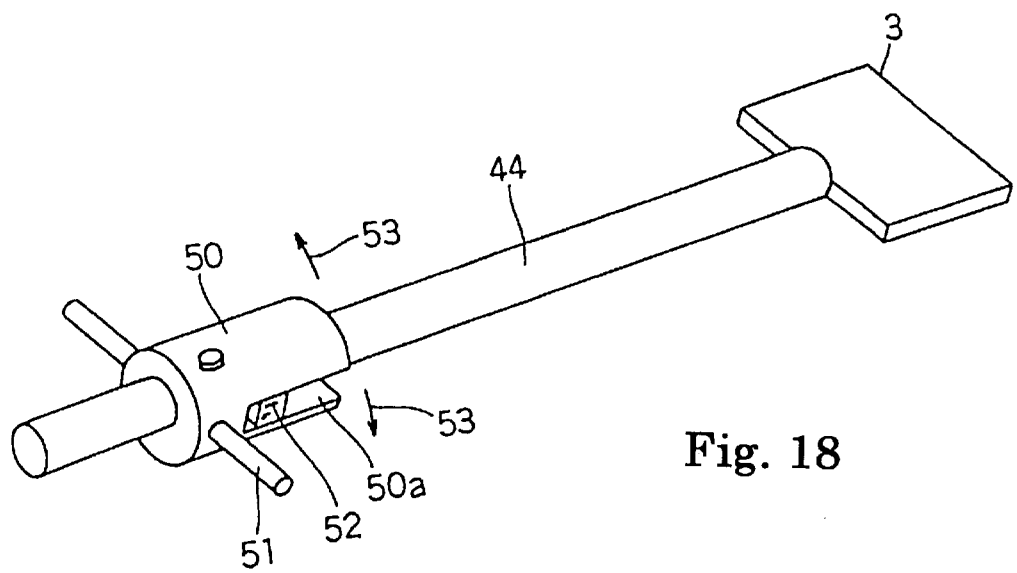
FIG. 18 briefly shows the construction of part of the optical deflection device of a fourteenth embodiment.

FIG. 18 shows part of an optical deflection device of an fourteenth embodiment. The fourteenth embodiment provides a cylinder 50 connected to a torsion spring 44 as a variable inertia member. The cylinder 50 is attached to the torsion spring 44 by a rod-like member 51 passing through the torsion spring 44 and the cylinder 50. The cylinder 50n has a notch 50a cut in the end on the reflective mirror 3 side, and two laminate-type piezoelectric elements 52 (only one shown in the drawing) are attached in the notch 50a so as to be medial to the torsion spring 44. The two laminate-type piezoelectric elements 52 expand and contract in a direction perpendicular to the rotational center axis via an applied voltage.

When the laminate piezoelectric element 52 expands from the state shown in FIG. 18, the notch 50a is expanded in the direction of the arrow 53. Since the cylinder 50 is included in the oscillation system, the distance of the cylinder 50 from the rotational center axis changes as the notch 50a becomes wider, thereby changing the inertia of the oscillation system. The controller controls the voltage applied to the laminate piezoelectric element 52 so as to attain a state of resonance of the oscillation system based on the detection result of the sensor.

Fifteenth Embodiment

Figure 19:
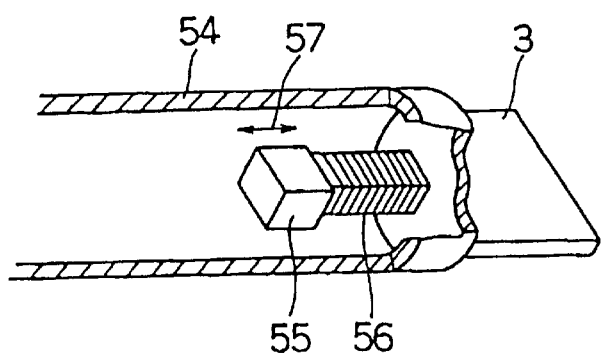
FIG. 19 briefly shows the construction of part of the optical deflection device of a fifteenth embodiment.

FIG. 19 shows part of a fifteenth embodiment. In FIG. 19, part of the torsion spring 54 is shown in a cutaway state to 1facilitate understanding of the of the construction of the hollow part of the torsion spring 54. The torsion spring 54 is actually a hollow rod-like member. At the end of the hollow part of the torsion spring 54 on the reflective mirror 3 side is attached a laminate piezoelectric element 56 which expands and contracts in the rotational axis direction via an applied voltage. A spindle 55 is attached at the other end of the laminate piezoelectric element 56. The position of the spindle 55 is moved in the direction of the arrow 57 by the expansion and contraction of the laminate piezoelectric element 56.

In the torsion spring 54, the spring constant is different at each position. The spring constant at each position is larger at the end of the base side. In this way the influence of inertia of the spindle 55 acting on a spring force decreases nearer to the end on the base side. That is, the nearer the spindle 55 is to the end on the base side, the larger becomes the natural oscillation frequency of the oscillation system. The controller controls the voltage applied to the laminate piezoelectric element 52 so as to maintain a state of resonance eof the oscillation system based on the detection result of the sensor.

Sixteenth Embodiment

Figure 20:
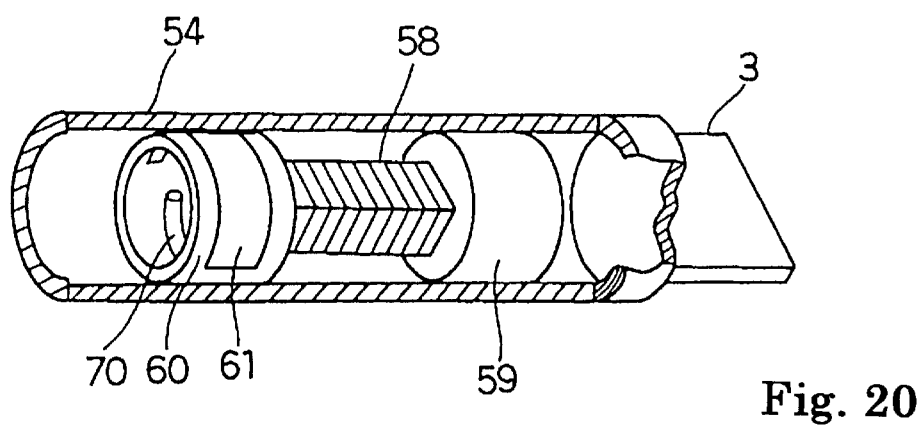
FIG. 20 briefly shows the construction of part of the optical deflection device of a sixteenth embodiment.

FIG. shows part of a sixteenth embodiment. In FIG. 20, part of the torsion spring 54 is shown in a cutaway state to facilitate understanding of the construction of the hollow part of the torsion spring 54. The torsion spring 54 is actually a hollow rod-like member. The hollow part of the torsion spring 54 houses a cylindrical pressure member 60 in contact with the walls of the hollow part. The pressure member 60 has a notched part and a pressure member 61 is inserted in this notched part. The pressure member 60 is formed of a carbon fiber reinforced resin. The pressure member 60 has a spring 70 in the hollow part, and the spring 70 is attached to the interior of the torsion spring 54. A friction force acts between the pressure member 60 and the contact part with the torsion spring 54.

One end of a piezoelectric element 58 is attached to one end of the pressure member 60, and a cylindrical spindle 59 is attached to the other end of the piezoelectric element. Since the piezoelectric element 58 expands and contracts in the rotational center direction via an applied voltage, the speed of expansion and contraction of the piezoelectric element 58 changes and the expansion/contraction operation repeated so as to move the center position regulator comprising a piezoelectric element 59,spindle 59, pressure members 60 and 61, and spring 70, in the rotational center direction. The controller controls the natural oscillation frequency of the oscillation system by controlling the position of the center position regulator in the same way as the fifteenth embodiment.

Seventeenth Embodiment

Figure 21:
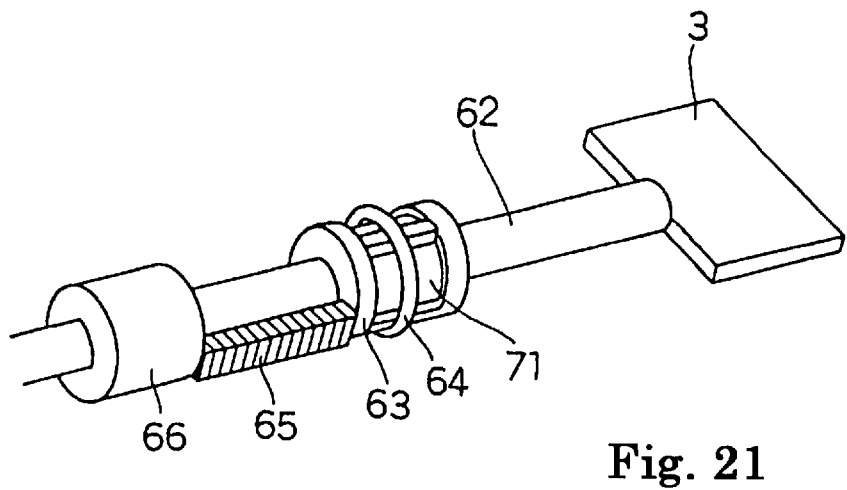
FIG. 21 briefly shows the construction of part of the optical deflection device of a seventeenth embodiment.

FIG. 21 shows part of a seventeenth embodiment. This optical deflection device differs from the sixteenth embodiment only insofar as it provides a center position regulator outside the torsion spring 62, and the torsion spring 62 is not hollow. The center position regulator of the seventeenth embodiment comprises pressure members 63 and 71, spring 64, piezoelectric element 65, and a spindle 66. The cylindrical pressure member 63 is connected to the torsion spring 62, and the pressure member 71 is inserted in the notch part of the pressure member 63. The spring 64 attaches the pressure member 63 to the torsion spring 62. The pressure member 63 is formed of carbon fiber reinforced resin, and a friction force acts between the pressure member 63 and the connection with the torsion spring 62.

One end of a piezoelectric element 65 is attached to the pressure member 63, and the other end is attached to the spindle 66. The spindle 66 is cylindrical in shape, and the torsion spring 62 passes through the hollow part of the spindle 66. In the present embodiment, the center position regulator can be moved in the rotational center axis direction by controlling the voltage applied to the piezoelectric element 65 in the same manner as in the seventeenth embodiment. The controller controls the resonance of the oscillation system by controlling the position of the center position regulator.

Eighteenth Embodiment

Figure 22:
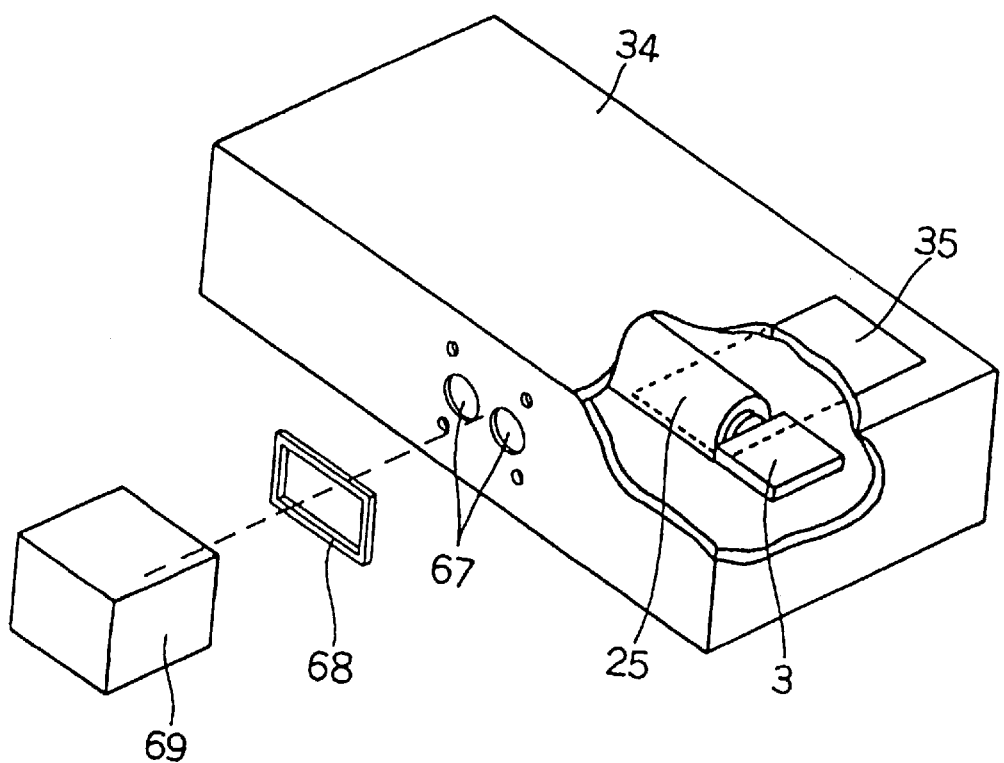
FIG. 22 shows the overall construction of the optical deflection device of an eighteenth embodiment.
Figure 23:
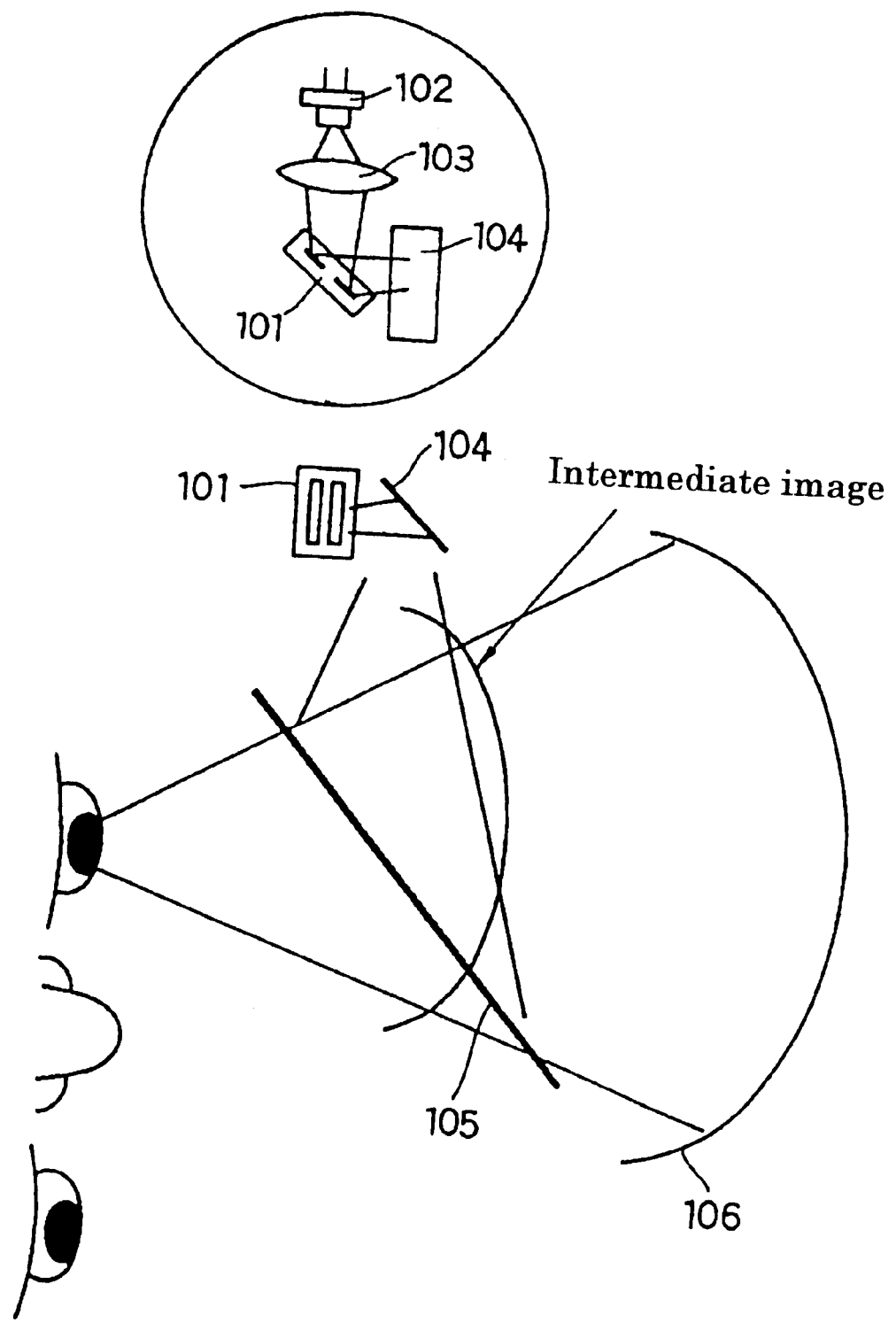
FIG. 23 briefly shows the optical system of a conventional scanning type display device viewed from above.

FIG. 22 shows the construction of an optical deflection device of an eighteenth embodiment. This optical deflection device has an air pressure regulating device 69 which replaces the heating device 40 and the cooling device 51 of the optical deflection device of the tenth embodiment shown in FIG. 14. An air pressure regulating hole 67 is provided in the housing 34. The air pressure regulating device 69 is mounted on the exterior of the housing 34 so as to regulate the air pressure within the housing 34 from the air pressure regulating hole 67 through the gasket 68.

The air pressure regulating device 69 regulates the air pressure within the housing 34. Since the air resistance acting on the reflective mirror 3 changes during rotational oscillation via the air pressure, the inertia of the oscillation system also changes. The air resistance increases as the air pressure increases, thereby increasing the inertia of the oscillation system. The controller controls the natural oscillation frequency so as to maintain resonance in the oscillation system by regulating the air pressure via the air pressure regulator based on the detection result of the sensor and thereby change the inertia.

The natural oscillation frequency is controlled to attain resonance in the oscillation systems in the aforesaid embodiments, but the control may also permit a suitable natural oscillation frequency in accordance with light signals to the deflection device.

Although a torsion spring which vibrates tortionally is used as the spring in the previously described embodiment, the present invention is not limited to such a spring. For example, a spring which flexurally vibrates in a bending direction also may be used.

According to these embodiments a scanning amplitude can be stabilized in an optical deflection device which scans a large amplitude at very high speed. Accordingly, this scanning device is suitable for projection image display devices. Since the scanning speed can be markedly varied, the optical deflection device has excellent general purpose characteristics for various projection image frequencies.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An optical deflection device comprising:
   a spring;
   a reflective mirror attached to the spring;
   an oscillator for oscillating the spring;
   a detector for detecting amplitudes of oscillation of the reflective mirror; and
   alteration means for changing a natural oscillation frequency of the spring in accordance with the amplitudes detected by the detector.

2. An optical deflection device as claimed in claim 1, wherein said spring is a torsion spring.

3. An optical deflection device as claimed in claim 1, wherein said alteration means changes a length of the spring.

4. An optical deflection device as claimed in claim 1, wherein said alteration means changes a temperature of the spring.

5. An optical deflection device as claimed in claim 1, wherein said alteration means changes a center of gravity position of an oscillation system including the spring and the reflecting mirror.

6. An optical deflection device according to claim 1, wherein said reflective mirror is attached to a free end of the spring.

7. An optical deflection device comprising:
   a spring;
   a reflective mirror which oscillates via the oscillation of a free end of the spring;
   an oscillator for oscillating the spring near a resonance frequency of the spring; and
   alteration means for changing a natural oscillation frequency of an oscillation system including the spring and the reflective mirror.

8. An optical deflection device as claimed in claims 7, wherein said spring is a torsion spring.

9. An optical deflection device as claimed in claim 7, wherein said alteration means changes a length of the spring.

10. An optical deflection device as claimed in claim 7, wherein said alteration means changes a temperature of the spring.

11. An optical deflection device as claimed in claim 7, wherein said alteration means changes a center of gravity position of an oscillation system including the spring and the reflecting mirror.

12. An optical deflection device according to claim 7, further comprising a detector for detecting amplitudes of oscillation of the reflective mirror.

13. An optical deflection device according to claim 12, wherein said alteration means changes the natural oscillation frequency based upon the amplitudes detected by the detector.

14. An optical deflection method comprising the steps of:
   oscillating a spring having a reflective mirror;
   detecting amplitudes of oscillation of the reflective mirror; and
   changing a natural oscillation frequency of the spring in accordance with the amplitudes detected by the detector.

15. An optical deflection method according to claim 14, further comprising the step of attaching the reflective mirror to a free end of the spring.

* * * * *